United States Patent [19]

Fox et al.

[11] Patent Number: 5,616,867
[45] Date of Patent: Apr. 1, 1997

[54] METHODS AND APPARATUS FOR DETERMINING A MINIMUM ACCEPTABLE VOLUME OF FLUID FLOW THROUGH A CONDUIT

[75] Inventors: Michael T. Fox, Midland; David C. Norton, Ann Arbor, both of Mich.

[73] Assignee: Quality Air Heating and Cooling of Midland Inc., Midland, Mich.

[21] Appl. No.: 430,880

[22] Filed: Apr. 28, 1995

[51] Int. Cl.$^6$ ........................................... G01F 1/42
[52] U.S. Cl. ........................... 73/861.62; 73/1.16
[58] Field of Search ................. 73/3, 861.52, 53, 73/54, 55, 58, 61, 62, 73

[56] References Cited

U.S. PATENT DOCUMENTS

| | | |
|---|---|---|
| 1,023,739 | 4/1912 | Joyce . |
| 2,197,954 | 4/1940 | Turpin . |
| 2,393,482 | 1/1946 | Smith . |
| 3,768,956 | 10/1973 | Muller et al. ........................ 431/20 |
| 4,393,722 | 7/1983 | Scott ............................... 73/861.61 |
| 4,407,185 | 10/1983 | Haines et al. ........................ 98/1.5 |
| 4,422,339 | 12/1983 | Gall et al. ........................ 73/861.61 |
| 4,429,710 | 2/1984 | Grieves et al. . |
| 4,938,077 | 7/1990 | Robinet ........................... 73/861.62 |
| 5,215,497 | 6/1993 | Drees ................................. 454/61 |

*Primary Examiner*—Richard Chilcot
*Assistant Examiner*—Max H. Noori
*Attorney, Agent, or Firm*—Learman & McCulloch

[57] ABSTRACT

A method and apparatus for monitoring and calibrating fluid flow through a conduit comprises sliding a control plate into the conduit and restricting the flow of fluid through the conduit so as to determine the minimum acceptable flow. The position of the control plate at minimum acceptable flow is determined, following which the plate is removed from the conduit. At periodic intervals the control plate again may be slid into the conduit to ascertain whether the acceptable minimum flow has changed, thereby verifying acceptable fluid flow and enabling remedial measures to be taken if the fluid flow has deteriorated.

17 Claims, 2 Drawing Sheets

METHODS AND APPARATUS FOR DETERMINING A MINIMUM ACCEPTABLE VOLUME OF FLUID FLOW THROUGH A CONDUIT

This invention relates to apparatus and methods for monitoring and calibrating fluid flow through a conduit and more particularly to such apparatus and methods for use in establishing the minimum acceptable fluid flow through a conduit and energizing a warning signal when the flow is below such minimum.

BACKGROUND OF THE INVENTION

It is common practice to provide an exhaust system for compartments, hoods, and other zones in which noxious gases and undesirable fumes are generated. Conventionally, the exhaust system includes one or more hooded compartments each of which is in communication with one end of an exhaust pipe through which a flow of exhaust gas is induced by means of a fan or blower. The exhaust pipe of each compartment may communicate with a gas conduit that is common to a plurality of compartments, or each compartment may have its own independent exhaust conduit. In either case, the rate at which the gas flows through the exhaust system must be sufficient to obtain effective exhaust of the noxious or otherwise undesirable fumes from each compartment so as to avoid contamination of the area adjacent that where the fumes are generated.

Currently, minimum flow of an exhaust gas stream is determined in a somewhat haphazard manner. For example, the exhaust stream inducing blower or fan has its speed adjusted from normal to less than normal, and frequently in successive stages, so as eventually to establish a minimum exhaust stream flow. One objection to this form of calibration is that substantial time is required to determine the minimum acceptable flow value.

Another disadvantage of the conventional calibration technique referred to above is that it is difficult or impossible to determine deterioration in the exhaust stream flow until the flow has been reduced to a level below that of the minimum value.

A further disadvantage of conventional systems is that the monitoring of less than all compartments coupled to a central exhaust system may compromise the safety of or disrupt work at one or more of the compartments that are connected to the central exhaust system.

An object of this invention is to overcome the objectionable characteristics referred to above.

SUMMARY OF THE INVENTION

An exhaust system for entraining and disposing of noxious gases and fumes has a common exhaust conduit having at one end an inlet coupled by subsidiary conduits to hooded enclosures or the like where the noxious gases are generated. Fitted to each of the subsidiary conduits is a blower or fan by means of which the gases can be exhausted from the associated enclosure and entrained in and delivered through the subsidiary conduit to a conduit common to all subsidiary conduits to a disposal area. At a selected zone along its length each subsidiary conduit of the exhaust system is provided with a slot that is straddled by a housing in which a flow control barrier plate is slideable from a position in which the plate is withdrawn from the conduit to any one of a number of selected positions within the conduit. The plate is provided with indicia which enable the operator to determine the position of the plate within the conduit.

The volume and rate of flow of exhaust gases through each exhaust conduit of the exhaust system will be directly related to the position of the control plate in such conduit. The volume of flow of the exhaust gases through each such conduit will diminish as the area of the plate within the conduit increases and, conversely, the volume will increase as the area of the plate within the conduit decreases. It thus is possible to vary the flow value of exhaust gases within wide limits without having to utilize a variable speed exhaust fan or blower.

THE DRAWINGS

The presently preferred embodiment of the invention is disclosed in the accompanying drawings, wherein.

DETAILED DESCRIPTION

Figure 1:
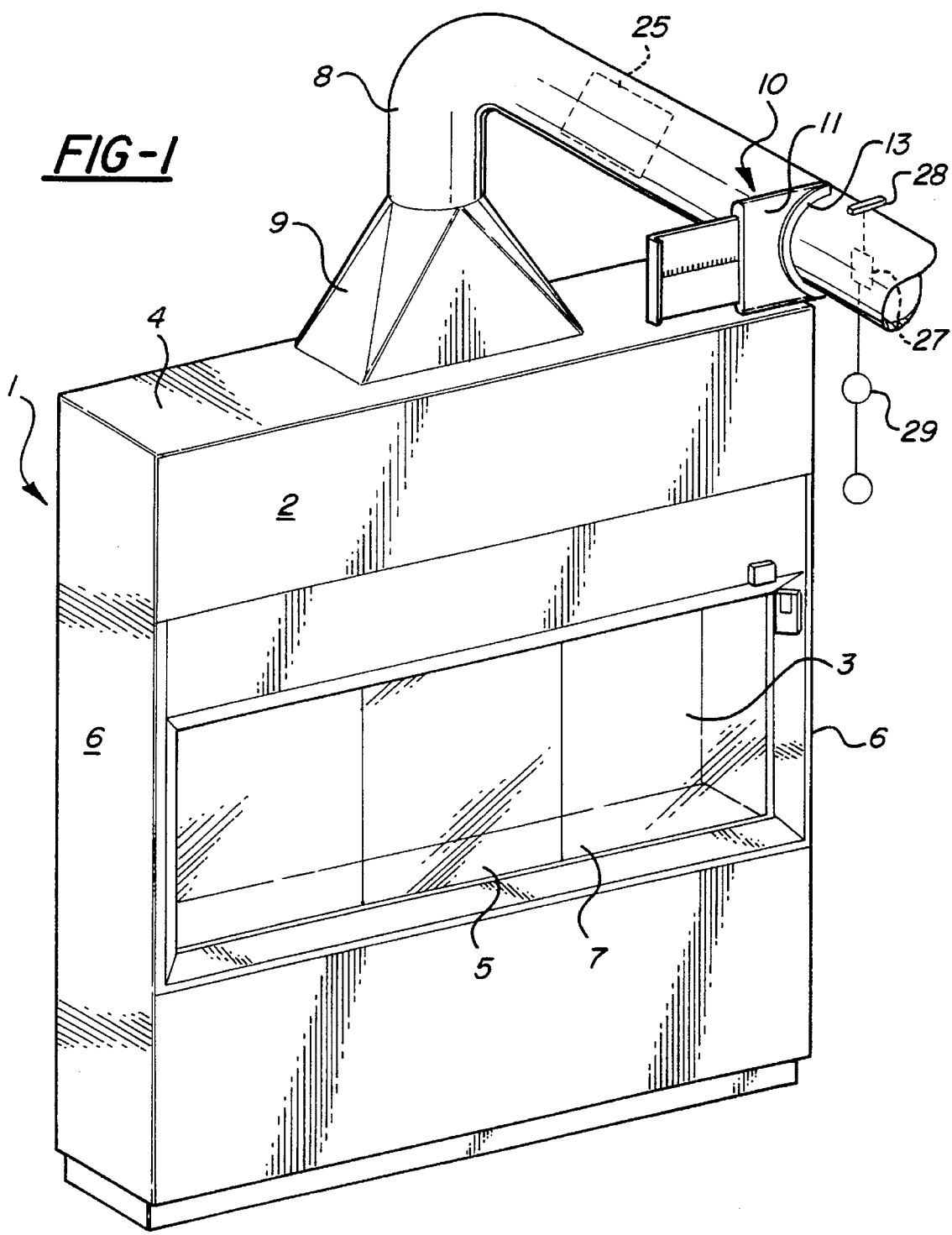
FIG. 1 is an isometric, fragmentary view illustrating the apparatus installed in an exhaust conduit of a hooded enclosure.

Apparatus constructed in accordance with the invention is especially adapted for use in conjunction with one or more hooded enclosures 1 of the kind having front, rear, top, bottom, and end walls 2, 3, 4, 5, and 6, respectively, each of such enclosures forming a compartment within which noxious or otherwise undesirable fumes and gases may be generated. The front wall 2 of the enclosure is provided with an opening which may be closed by a closure 7, as is conventional.

In communication with the enclosure 1, and preferably via the upper wall 4, is an exhaust conduit 8 having at one end a conical or other suitable inlet 9 in communication with the enclosure via an opening in the wall 4. The other end of the inlet is in communication with the conduit 8. The conduit 8 may be one of several that communicate with a common conduit (not shown) that extends to a discharge zone (not shown) into which gases extracted from the enclosure may be received.

At a suitable position or zone along the conduit 8 is a slot (not shown). Secured to the conduit is a housing 10 having opposed side walls 11 spaced from one another to form a passage through the housing. At one end of the housing is a collar 12 formed by a pair of semicircular limbs 13 which are welded or otherwise suitably secured in embracing relation to the conduit 8 and between which is a passage 14 in alignment with the slot in the conduit 8. At the opposite end of the housing 10 is a slot 15.

Slideably accommodated in the housing 10 and extending through the slot 15 is a calibrating and flow control plate 16 having a flat blade 17 terminating at one end in an arcuate nose 18 formed on a radius corresponding substantially to that of the conduit 8. The blade may be imperforate or provided with an array of openings (not shown) in such form as to promote uniformity of restricted gas flow. At its opposite end the blade 17 terminates in an offset flange 19 which facilitates manual movement of the blade through the passages in the housing and the collar and into and out of the conduit 8 via the slot in the latter. The blade 17 is provided with indicia such as a scale 20 by means of which the relative position of the blade within the conduit may be determined.

A sealing closure 21 also is included and comprises a wall 22 corresponding to the configuration of the free end of the housing 10 and having springy tabs 23 and 24 at its opposite ends and its opposite sides, respectively, for frictionally retaining the closure 21 on the housing 10 when desired. Any other suitable means for separably retaining the closure on the housing and sealing the slot 15 may be used, but it is preferred that no holes be formed in the housing for the accommodation of screws, bolts, and the like.

Figure 5:
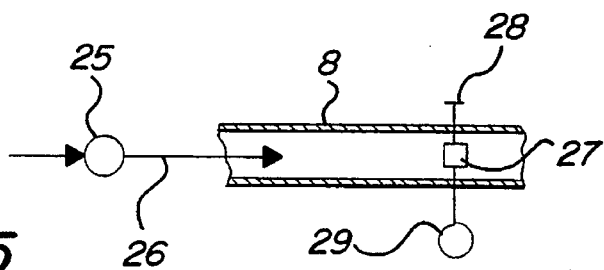
FIG. 5 is a highly diagrammatic illustration of the exhaust/alarm system.
Figure 2:
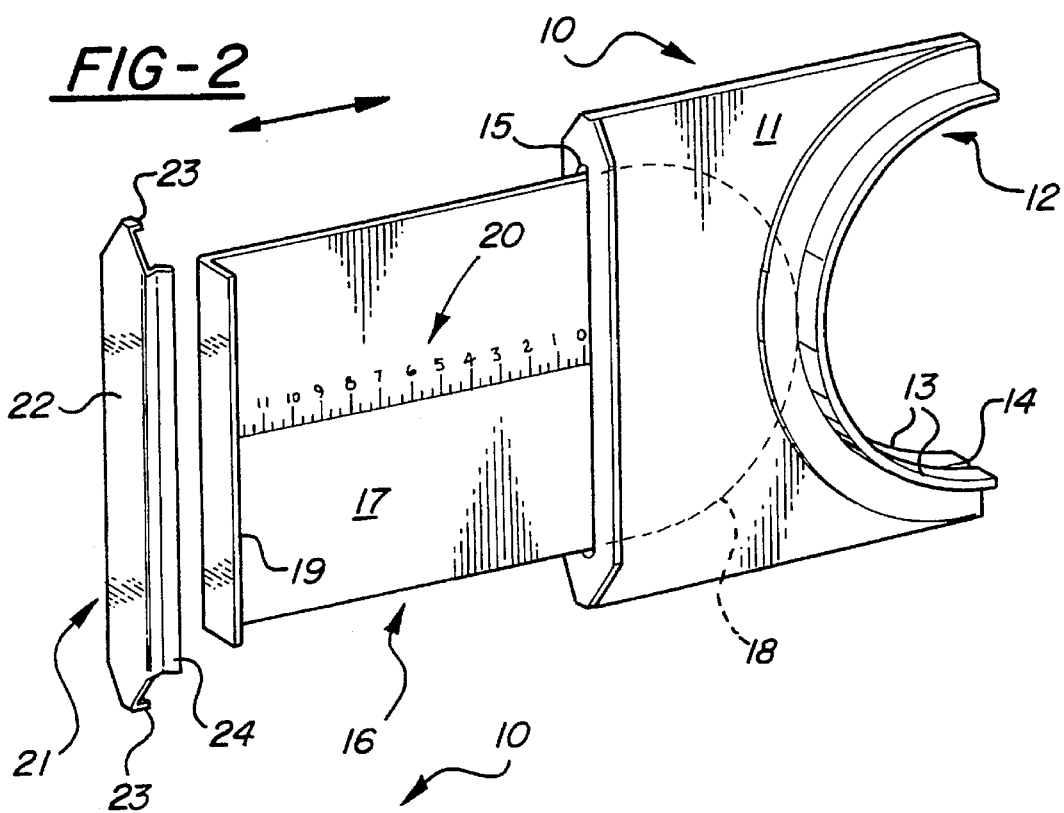
FIG. 2 is an isometric, exploded view of the fluid flow control plate and its associated parts.
Figure 3:
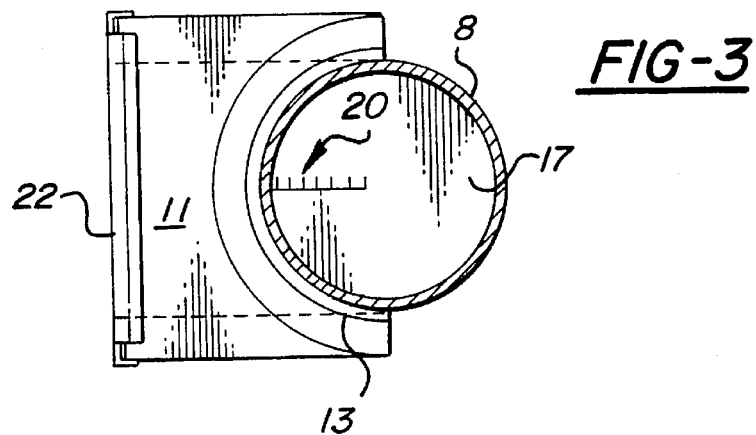
FIG. 3 is a sectional view on a reduced scale showing the flow control plate in its maximum flow-restricting position.
Figure 4:
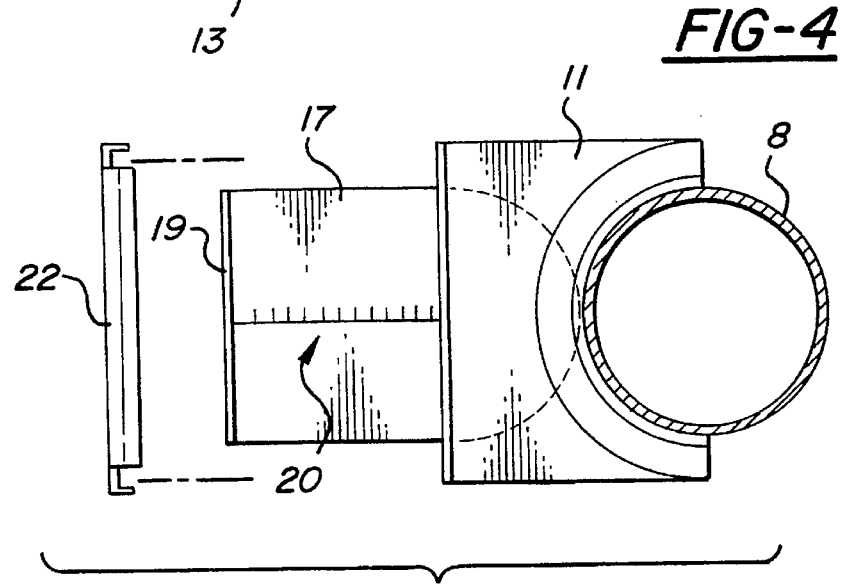
FIG. 4 is a view similar to FIG. 3, but showing the plate in its minimum flow-restricting position.

FIG. 5 discloses in simplified, diagrammatic form the essential characteristics of the system, excluding the plate 16. As shown, a fan or blower 25 functions to induce a stream 26 of air through the conduit 8 from its inlet 9 to its discharge. At a selected position within the conduit 8, and either upstream or downstream from the position of the plate 16, is a known, electrically operated or other suitable sensor 27 which is operable to sense the velocity and/or volume at which the gas stream 26 flows through the conduit 8. Coupled to the sensor 27 is an adjustment 28 which controls the sensitivity of the sensor. Also coupled to the sensor is an alarm 29 which may be either visual, or audible, or both.

The sensor 27 is designed to detect the velocity and/or volume value of gas that flows through the conduit and, should the value decrease to an unacceptable level, activate the signal 29 which warns an operator of the inadequate flow value. The particular level of inadequate flow value more than likely will vary from one enclosure to another, so it is not likely that a single setting for each sensor 27 may be preset at the factory.

To set the sensor alarm point at a flow value which is considered inadequate, the sensor must be calibrated. This may be accomplished in apparatus constructed and operated in accordance with the invention by energizing the blower 25 so as to generate a gas stream 26 through the conduit 8. The blade 17 may be fitted to the housing 10 and pushed through the latter and into the conduit 8 via the slot 15 so as partially or substantially to obstruct the flow of gas through the conduit. The minimum acceptable gas flow value may be established by adjustment of the sensor 27 so that, at such minimum value, the sensor. 27 will activate the signal 29. The indicia 20 on the blade 17 may be read in conjunction with the free end of the housing 10 so as to observe the position of the blade within the conduit that results in unacceptable gas flow. For example, if the numeral 6 is adjacent the free end of the housing 10 when the signal is activated, it indicates that, in the disclosed embodiment, about half the area of the conduit 8 at the position of the housing 10 is blocked by the blade.

Once the minimum acceptable gas flow value has been established, the sensor 27 may be set to activate an alarm when the minimum acceptable gas flow level occurs during use of the apparatus. The blade 17 then may be removed from the housing 10 and the closure 21 fitted to the free end of the housing so as to seal the slot 15 and, consequently, the passages which communicate with the slot and the conduit. The blade 17 then may be taken to another installation or to another conduit forming part of a central system and used in the same manner for calibrating the minimum gas flow through another conduit.

In lieu of the closure 21 the opening 15 may be sealed by rubbery or other resilient lips on opposite sides of the opening which normally engage one another but which may be parted to enable the blade 17 to pass therebetween.

Periodically, it is desirable to verify that the gas flow through a conduit remains at a desired level. This may be accomplished by removing the closure 21, inserting the plate 16 into the housing 10 and pushing the blade 17 into the conduit 8 so as to verify that the predetermined minimum acceptable gas flow occurs when the numeral 6, for example, is adjacent the free end of the housing 10. If the signal 29 is energized when some numeral higher or lower than 6 is adjacent the free end of the housing, then it will be apparent that there is some malfunction which has produced a lower than anticipated gas flow value through the conduit. An investigation then may be undertaken and the malfunction remedied.

The disclosed embodiment is representative of a presently preferred form of the invention, but is intended to be illustrative rather than definitive thereof. The invention is defined in the claims.

We claim:

1. Apparatus for use in determining a minimum acceptable volume of fluid flow through a conduit, said apparatus comprising means for inducing fluid flow through said conduit at a volume greater than a minimum acceptable volume; barrier means movable from a first position in which fluid flow through said conduit is substantially unrestricted to a second position in which fluid flow through said conduit is restricted to a volume less than said acceptable minimum volume; sensor means for sensing the volume of fluid flow through said conduit; and signal means operable in response to sensing by said sensor means of a reduction in the volume of fluid flowing through said conduit to a volume less than said minimum acceptable volume for signaling said reduction.

2. Apparatus according to claim 1 wherein said conduit has a slot therein through which said barrier passes into and out of said conduit.

3. Apparatus according to claim 2 including a housing carried by said conduit and straddling said slot, said housing having a passage in alignment with said slot and through which the barrier passes during its movements into and out of said conduit.

4. The apparatus according to claim 3 including a closure removably carried by said housing for sealing said passage.

5. The apparatus according to claim 2 including indicia carried by said barrier for indicating the position said barrier occupies in said conduit.

6. The apparatus according to claim 2 wherein said barrier is of such length as to extend completely through said housing and at least most of the width of said conduit.

7. The apparatus according to claim 6 wherein that end of said barrier which enters said conduit has a configuration complementary to that of said conduit opposite said slot.

8. The apparatus according to claim 2 wherein said conduit is circular in section and including a semicircular collar embracing said conduit on opposite sides of said slot, said collar being formed on a radius corresponding substantially to that of said conduit.

9. The apparatus according to claim 1 wherein said fluid is a gas.

10. The apparatus according to claim 9 wherein the means for inducing gas flow through said conduit comprises a blower.

11. The apparatus according to claim 1 wherein said conduit has a slot therein through which said barrier extends, said barrier being removable from said housing, and a closure carried by said housing once the barrier is removed therefrom for sealing one end of the passage in said housing.

12. Apparatus for use in determining a minimum acceptable volume of gas flow through a conduit, said apparatus comprising gas flow inducing means operable at a speed sufficient to induce gas flow through said conduit at a volume greater than the minimum acceptable volume; barrier means movable while said gas flow inducing means operates at said speed from a first position in which gas flow through said conduit is substantially unrestricted to a second position in which gas flow through said conduit is restricted to a volume less than said acceptable minimum volume; sensor means for sensing the volume of gas flow through said conduit; and signal means operable in response to sensing by said sensor means of a reduction in the volume of gas flowing through said conduit to a volume less than said minimum acceptable volume for signaling said reduction.

13. A method for determining minimum acceptable fluid flow through a conduit comprising establishing in said conduit fluid flow at a value in excess of said acceptable minimum; moving a barrier into said conduit to a first position in which said fluid flow is restricted and reduced to a value less than that of said acceptable minimum; sensing the change in value of said fluid flow as it decreases to a value less than that of said acceptable minimum; energizing a signal in response to the reduction of the value of said fluid flow below said acceptable minimum value; adjusting said barrier to a second position in which said fluid is enabled to flow through said conduit at a volume at least as great as that of said acceptable minimum; and noting said second position of said barrier.

14. The method according to claim 13 including adjusting the minimum value of fluid flow which will energize said signal.

15. The method according to claim 13 including energizing an alarm when the value of fluid flow through said conduit is below that of said minimum acceptable level.

16. The method according to claim 13 wherein said fluid is a gas.

17. A method for determining minimum acceptable gas flow through a conduit comprising operating a blower at a speed sufficient to induce gas flow through said conduit at a value in excess of said acceptable minimum; maintaining said speed of said blower while moving a barrier into said conduit to a position in which gas flow is restricted and reduced to a value less than that of said acceptable minimum; sensing the change in value of said gas flow as it decreases to a value less than that of said acceptable minimum; energizing a signal in response to the reduction of the value of said gas flow less than said acceptable minimum value; and adjusting said barrier to a position in which said gas is enabled to flow through said conduit at a volume at least as great as that of said acceptable minimum.

* * * * *